No. 736,461. Patented August 18, 1903.

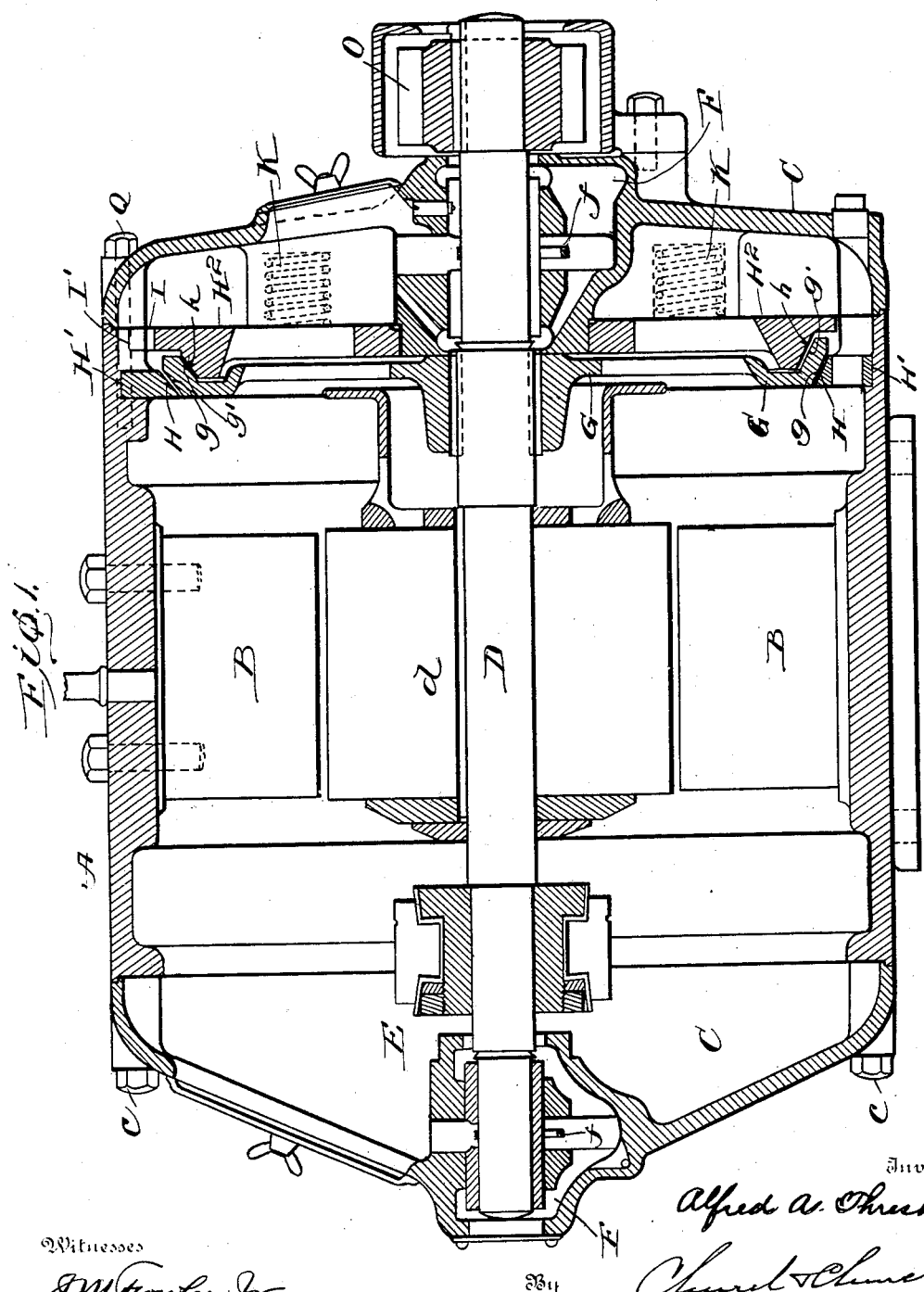

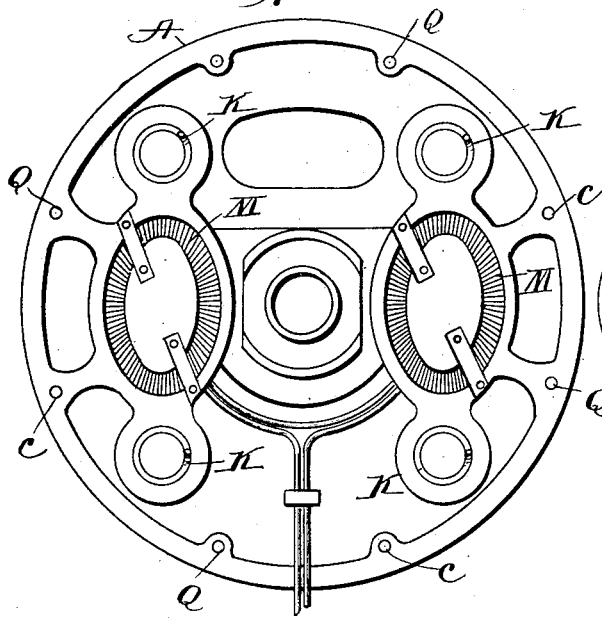
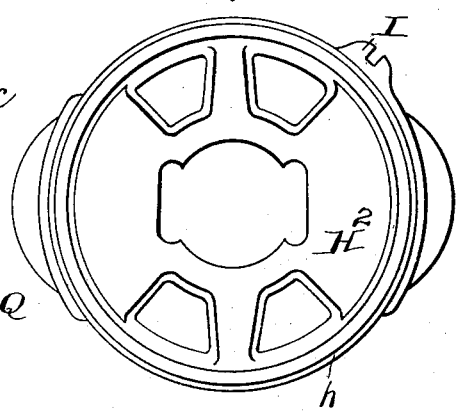
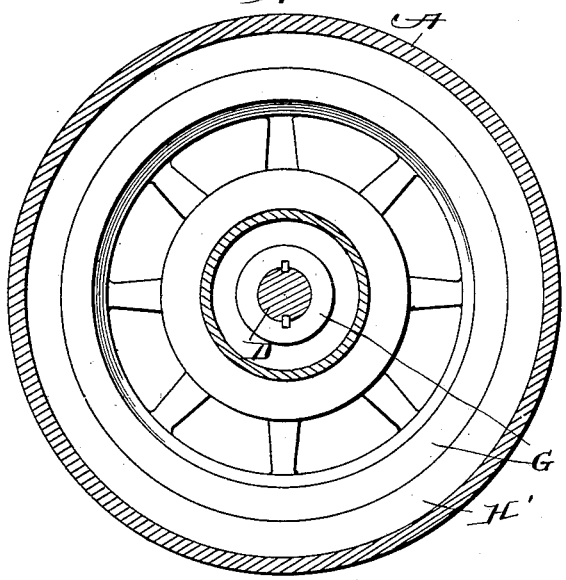
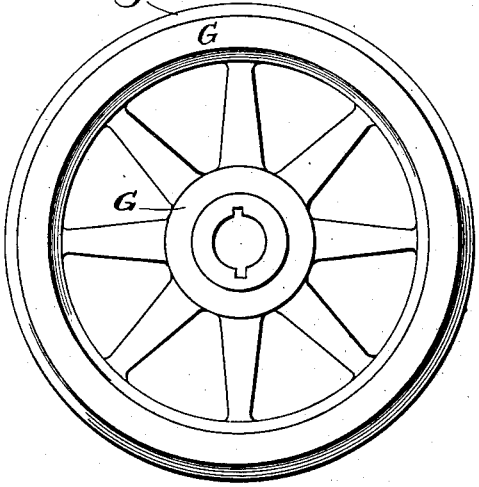

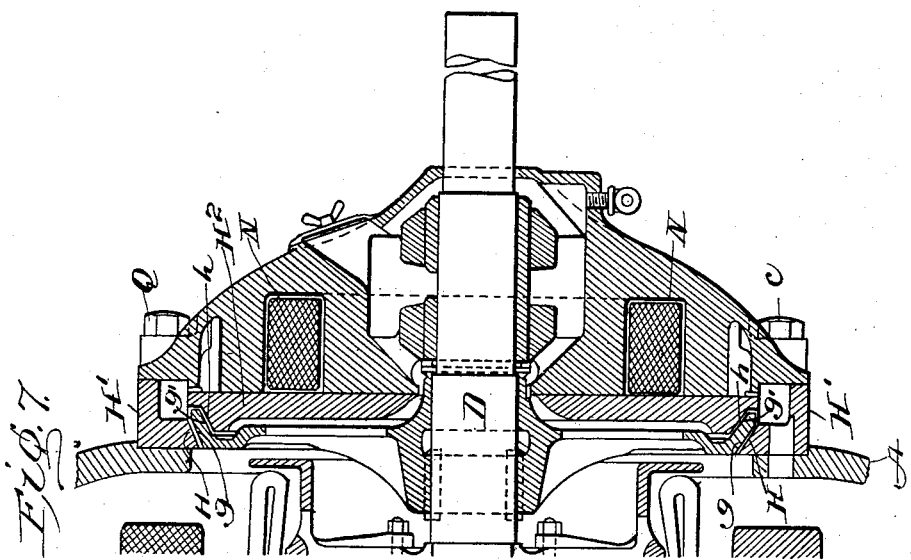
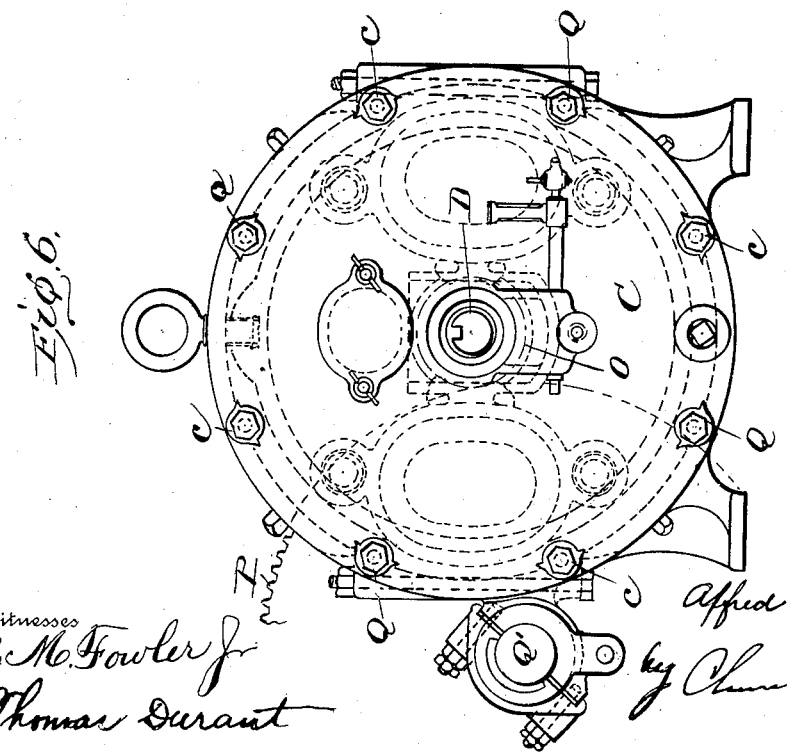

UNITED STATES PATENT OFFICE.

ALFRED A. THRESHER, OF DAYTON, OHIO.

ELECTRIC MOTOR AND BRAKE.

SPECIFICATION forming part of Letters Patent No. 736,461, dated August 18, 1903.

Application filed June 17, 1903. Serial No. 161,923. (No model.)

*To all whom it may concern:*

Be it known that I, ALFRED A. THRESHER, of Dayton, in the county of Montgomery, State of Ohio, have invented certain new and useful Improvements in Electric Motors and Brakes; and I do hereby declare the following to be a full, clear, and exact description of the same, reference being had to the accompanying drawings, forming a part of this specification, and to the letters of reference marked thereon.

This invention relates to improvements in brake mechanism for electric motors—such, for instance, as are used in ammunition-hoists, &c.—where it is necessary or desirable that the load shall be held if the actuating-current fails or the motor becomes inoperative for any cause.

The invention consists in certain novel details of construction and combinations and arrangements of parts, all as will be now described, and pointed out particularly in the appended claims.

In the accompanying drawings, Figure 1 is a vertical section through a motor embodying the present improvements, certain details of the motor portion of the structure being omitted, as they form no part of the present invention. Fig. 2 is a detail section taken through the shaft at right angles to Fig. 1. Figs. 3, 4, and 5 are detail elevations, respectively, of one head of the motor, the clamping-disk, and brake-wheel. Fig. 6 is an end elevation of the motor, dotted lines showing the brake-release magnets and drive-gearing. Fig. 7 is a section corresponding to Fig. 2, but showing a different arrangement of the magnet.

Similar letters of reference in the several figures indicate the same parts.

The motor illustrated is of the inclosed type, having a casing A, to which the pole-pieces B are connected, and heads C, secured to the ends of the casing, preferably by bolts c. The heads support or have formed therein bearings for the shaft D, which latter carries the armature d and commutator E, both of ordinary or preferred construction. The bearings for the shaft have oil-reservoirs F therein, and a suitable means, such as a ring traveler f, for carrying the oil to the top of the shaft as the latter is rotated.

Between one of the heads, preferably the head remote from the commutator and the armature, there is a brake-wheel or disk G keyed on the shaft, so as to have a limited movement longitudinally of the shaft. The periphery of this brake-wheel or disk is formed with a frusto-conical or inclined friction-surface $g$, adapted to coöperate with a reversely-inclined surface or friction-bearing H, which may be directly on the casing, but is preferably on a separate ring or annular frame H', clamped between the head and casing, as will presently appear. A second frusto-conical or inclined friction-surface $g'$ on the opposite side of the wheel or disk G coöperates with a similar surface $h$ on a clamping-disk $H^2$, preferably mounted on the head of the motor, so as to be held against rotation, but so as to be capable of a bodily movement longitudinally of the shaft. The clamping-disk may be mounted on a central hub of the head and is held against rotation by a lug I', adapted to enter a slot or slotted wing I on the disk.

The clamping-disk is advanced to clamp the brake-wheel between it and the inclined surface on the casing by spring-pressure and preferably by a multiplicity of springs K, Figs. 1 and 3, located in sockets or recesses in the head and bearing directly against the clamping-disk.

The clamping action of the disk under the influence of the springs is sufficient to arrest the motion of the armature-shaft and to hold the same stationary against the weight of the load. Thus the shaft may be said to be normally held by the brake, and in order to release the same an electromagnet or magnets is or are formed on the head, preferably by recessing said head for the reception of a coil or coils M. Said magnets act on the disk in opposition to the force of the springs and are preferably controlled by the working current for the motor, either a direct or a shunt circuit being employed.

In the construction of Figs. 1 to 6 two coils M are employed, one on each side of the center of the head, thereby forming a strong magnetic circuit, with the body of the head as a base and the projecting portions of the head inside and outside the coils as the pole-pieces for acting on the clamping-disk; but it is obvious that for some purposes it may be desirable to use magnets of different specific construction—as, for instance, a single coil. This may be done by forming an annular recess in the head, extending around the armature-shaft, as shown, for instance, in Fig. 7, where the coil is indicated by the letter N. In any instance it will be seen that the magnets are on the interior of the end head or closure for the motor, together with the brake-wheel and clamping-disk. The frusto-conical or inclined face form of the friction-surfaces greatly increases the power of the brake, the wheel being wedged between two surfaces instead of being simply pressed against one surface or clamped between two surfaces extending in planes at right angles to the axis of rotation.

The whole structure is exceedingly simple and compact, and the motor, together with its brake mechanism, presents a similar appearance, occupies practically the same space as and is protected against injury similar to an ordinary motor without a brake mechanism.

By forming the fixed friction-surface as a ring separate from the casing it may be readily adjusted or renewed and, what is of greater importance, it may be clamped to the head—as, for instance, by the bolts Q and c— some of which may extend only into the ring and others extend through the ring and into the casing to hold the head and brake in place. Thus by loosening the bolts which hold the head in place the whole head, brake, and attached parts may be removed as a body to gain access to the motor. With such construction the removal of the head does not necessitate the separation or change in adjustment of the brake mechanism, as would be the case if the fixed friction-surface were formed integral with the casing.

The power from the armature-shaft is preferably transmitted through a spur-gear O to a gear-wheel P, mounted on a shaft Q', journaled in bearings on the side of the motor-casing and from the latter to the mechanism to be driven.

Obviously the circuit for the brake may be controlled independently of the motor itself without departing from the invention; but the parts are designed more especially for use in connection with a motor which must be automatically controlled should the current be shut off or the motor become accidentally injured, so as to interrupt the application of its power.

Having thus described my invention, what I claim as new, and desire to secure by Letters Patent, is—

1. The combination with an electric motor, its shaft and inclosing casing embodying heads having bearings for the shaft, of a brake-wheel on the shaft between the heads, a surface with which said wheel coöperates, a spring for effecting engagement between the wheel and its coöperating surface and an electromagnet for holding the same out of such engagement against the tension of the spring; substantially as described.

2. The combination with an electric motor, its shaft and inclosing casing embodying heads having bearings for the shaft, of a brake-wheel longitudinally movable on the shaft between the heads, a fixed friction-surface with which said wheel coöperates, a spring for moving the wheel longitudinally of the shaft and into contact with its coöperating fixed friction-surface and an electromagnet for holding the wheel out of engagement with said coöperating surface; substantially as described.

3. The combination with an electric motor, its shaft, armature and inclosing casing embodying heads having bearings for the shaft of a magnetically-released friction-brake for the shaft located between the armature and one of the heads of the casing; substantially as described.

4. The combination with an electric motor, its shaft, armature and inclosing casing embodying heads having bearings for the shaft, of a magnetically-released friction-brake for the shaft located between the armature and one of the heads of the casing and an electromagnet for releasing the brake located on the head and controlled from the motor-actuating circuit; substantially as described.

5. The combination with an electric motor, its shaft, armature and inclosing casing embodying heads having bearings for the shaft, of a friction brake wheel mounted to move longitudinally of the shaft and between the armature and head of the casing, a fixed friction-surface with which the wheel coöperates, a clamping-disk between the wheel and head, springs acting on the disk to move the wheel into engagement with its coöperating fixed friction-surface and an electromagnet in the head for moving the disk against the tension of its springs to release the wheel; substantially as described.

6. The combination with an electric motor, its shaft, armature and inclosing casing embodying heads having bearings for the shaft, and an inclined fixed friction-surface, of a clamping-disk movable longitudinally of the shaft and having an inclined friction-surface, springs for moving said disk in one direction, an electromagnet for moving the disk against the tension of its springs, and a friction-brake wheel on the shaft having frusto-conical friction-surfaces adapted to be clamped between the inclined surfaces of the disk and fixed friction-surface; substantially as described.

7. The combination with an electric motor, its shaft, armature and casing embodying heads having bearings for the shaft, of a magnetically-controlled friction-brake for the shaft located between the armature and one of the heads and an electromagnet for controlling said brake having its coil recessed into the inner face of the head; substantially as described.

8. The combination with an electric motor, its shaft, armature and casing embodying heads having bearings for the shaft, of a magnetically-controlled friction-brake wheel on the shaft between the armature and one head, a disk loosely mounted on said head, springs for moving the disk away from the head and into engagement with the wheel to apply the brake and an electromagnet on the inner face of the head for releasing the brake; substantially as described.

9. The combination with an electric motor, its shaft, armature and casing embodying heads having bearings for the shaft, of a magnetically-controlled friction-brake wheel on the shaft between the armature and one head, a relatively fixed ring on the inner side of said wheel and means for securing the ring and head together whereby the head and friction-brake may be removed as a body; substantially as described.

10. The combination with an electric motor, its shaft, armature and casing embodying heads having bearings for the shaft, of a friction-ring between the head and casing, a brake-wheel movable longitudinally of the shaft between the head and ring, springs for moving the wheel into engagement with the ring, an electromagnet for moving the wheel in the opposite direction and means for securing the ring and head together; substantially as described.

ALFRED A. THRESHER.

Witnesses:
   JAMES R. WALLACE,
   CLAUDE W. HOSIN.